(12) United States Patent
Shang et al.

(10) Patent No.: US 9,046,964 B2
(45) Date of Patent: Jun. 2, 2015

(54) FRAME COMPONENT FOR INFRARED TOUCH SCREEN AND INFRARED TOUCH SCREEN

(75) Inventors: Xiaodong Shang, Beijing (CN); Yangqun Wu, Beijing (CN); Xinbin Liu, Beijing (CN)

(73) Assignee: BEIJING IRTOUCH SYSTEMS CO., LTD, Beijing (CN)

( * ) Notice: Subject to any disclaimer, the term of this patent is extended or adjusted under 35 U.S.C. 154(b) by 382 days.

(21) Appl. No.: 13/542,473

(22) Filed: Jul. 5, 2012

(65) Prior Publication Data

US 2013/0106783 A1    May 2, 2013

(30) Foreign Application Priority Data

Oct. 27, 2011   (CN) .......................... 2011 1 0331320
Oct. 27, 2011   (CN) .......................... 2011 1 0331338

(51) Int. Cl.
G06F 3/042    (2006.01)
G06F 3/03     (2006.01)

(52) U.S. Cl.
CPC ............ *G06F 3/0428* (2013.01); *G06F 3/0304* (2013.01)

(58) Field of Classification Search
CPC .................................................. G06F 3/0421
USPC ......................................................... 345/175
See application file for complete search history.

(56) References Cited

U.S. PATENT DOCUMENTS

| | | | | | |
|---|---|---|---|---|---|
| 3,775,560 | A | * | 11/1973 | Ebeling et al. | 178/18.09 |
| 4,818,859 | A | * | 4/1989 | Hough | 250/221 |
| 4,936,683 | A | * | 6/1990 | Purcell | 356/152.2 |
| 5,004,908 | A | * | 4/1991 | Nakamura | 250/221 |
| 5,577,733 | A | * | 11/1996 | Downing | 273/348 |
| 2007/0081318 | A1 | * | 4/2007 | Lynch et al. | 361/807 |
| 2009/0021488 | A1 | * | 1/2009 | Kali et al. | 345/173 |
| 2009/0322708 | A1 | * | 12/2009 | Xuan et al. | 345/175 |
| 2010/0110027 | A1 | * | 5/2010 | Lipman et al. | 345/173 |

FOREIGN PATENT DOCUMENTS

| | | |
|---|---|---|
| CN | 200941200 Y | 8/2007 |
| CN | 201127144 Y | 10/2008 |
| CN | 201869459 U | 6/2011 |

* cited by examiner

*Primary Examiner* — Dorothy Harris
(74) *Attorney, Agent, or Firm* — Harness, Dickey & Pierce, P.L.C.

(57) ABSTRACT

A frame component for an infrared touch screen is provided, which can reduce the thickness of the infrared touch screen. The frame component has a light transmission body which is provided with a plurality of first avoid holes and/or first avoid slots along the length direction for avoiding locations of the infrared emitting tubes and infrared receiving tubes. An infrared touch screen comprising the frame component is also provided. The infrared touch screen further comprises a printed circuit board and a lower support component. A plurality of second avoid holes and/or second avoid slots is arranged on the lower support component for avoiding locations of electronic devices. A light transmission part, the printed circuit board and the support components are mutually clamped tightly to form a sandwich structure. The infrared touch screen according to the present invention has advantages of ultra-thinness and good circuit board firmness.

21 Claims, 9 Drawing Sheets

FRAME COMPONENT FOR INFRARED TOUCH SCREEN AND INFRARED TOUCH SCREEN

CROSS-REFERENCE TO RELATED APPLICATION

This application claims the benefit of Chinese Patent Application No. 201110331320.1 filed Oct. 27, 2011, and Chinese Patent Application No. 201110331338.1 filed Oct. 27, 2011, the entire disclosures of which are incorporated herein by reference.

TECHNICAL FIELD OF INVENTION

The present invention relates to the field of photoelectric technology, and particularly, to a frame component for an infrared touch screen and an infrared touch screen comprising the frame component.

BACKGROUND OF THE INVENTION

An existing infrared touch screen generally comprises an infrared tube-pair array installed on a printed circuit board around a touch detection area. The infrared tube-pair array comprises infrared emitting tubes and infrared receiving tubes. The infrared emitting tubes and the infrared receiving tubes are in a one-to-one correspondence so that the infrared receiving tubes may receive infrared light emitted by the corresponding infrared emitting tubes. When there is a touch object in the touch detection area, the light between some of the infrared emitting tubes and the corresponding infrared receiving tubes is blocked by the touch object. The infrared receiving tubes cannot receive the infrared light emitted by the corresponding infrared emitting tubes, whereby location information of the touch object may be determined according to location information of the infrared receiving tubes that cannot receive the infrared light.

For the infrared touch screen in the prior art, generally the printed circuit board installed with the infrared tube-pair array is installed in a frame. The frame's strength and flatness would maintain the circuit board's strength and flatness. Thus it is required to leave a space within the frame to accommodate the infrared tube-pair array and other electronic devices. Since there is usually a gap between the frame and at least one surface of the circuit board, the circuit board is easily deformed. Even if pressed tightly using foam, the frame and the circuit board are contacted at some points, and the frame is still prone to warping. The Chinese patent applications No. CN200620063264.2 "Outer Frame Structure for Infrared Touch Screen" and No. CN200720190699.8 "Frame for Infrared Touch Screen" disclose that there is a cavity within the frame to avoid the locations of the infrared emitting tubes, infrared receiving tubes and other electronic devices (both the infrared emitting tube and infrared receiving tube belong to the electronic device). Such the touch screen with this structure cannot adapt to current need for ultra-thin products due to increasing the thickness of the infrared touch screen. On the other hand, the printed circuit board located in the cavity is fixed only with bolts and screws locally. There is very little contact area of the framework to the printed circuit board, thereby the fixing effect is poor and the printed circuit board is prone to warping and deforming. Such the warping and deforming will cause effective light paths difficult to form between the infrared emitting tubes and corresponding infrared receiving tubes, leading to a wrong judgment for touch recognition, and may seriously cause the infrared touch screen to lose the touch recognition functionality.

In addition, in order to enable the infrared light emitted by the infrared emitting tubes to transmit through the frame of the touch screen or display to be received by the infrared receiving tubes, it is required to install a light filtering device in front of the infrared emitting tubes and infrared receiving tubes (such as light filtering sheet, also known as light transmission sheet). The light filtering device may be used for light transmission, and on the other hand, for filtering other stray light than the infrared light. In the prior art, generally there is a light transmission window on the frame and the light transmission sheet is installed in the window. Usually, the intensity of the light transmission sheet is relatively small and a special support component is needed for supporting or fixing the light transmission sheet. It is necessary for the infrared touch screen with this structure to make molds for the support component and the light transmission sheet separately, which results in high cost and complex production process and is not suitable for the ultra-thin infrared touch screens. Moreover, due to fixing the light transmission sheet, the support component must have a certain thickness, which will limit the reduction in the thickness of the touch screen.

Also, due to the limitation on the thickness of the infrared touch screen, the touch display comprising the infrared touch screen of the prior art can hardly be very thin, and cannot meet the market demands for ultra-thin super-narrow touch display.

SUMMARY OF THE INVENTION

The main objective of the present invention is to provide a frame component for an infrared touch screen and an infrared touch screen comprising the frame component, which can decrease the thickness of the frame of the touch screen to a maximum extent, and can improve the flatness and steadiness of a circuit board in the touch screen.

According to the first aspect of the present invention, there is provided a frame component for an infrared touch screen, which is installed on an upper surface of a printed circuit board of the infrared touch screen, a plurality of infrared emitting tubes or infrared receiving tubes being arranged on the upper surface, the frame component comprising: a plurality of avoid holes or avoid slots for avoiding locations of the infrared emitting tubes or infrared receiving tubes; wherein a surface of the frame component facing toward the printed circuit board supports a non-electronic-device area of the upper surface of the printed circuit board in a surface contact manner, and wherein a portion of the frame component on a light path of the infrared touch screen is made of an infrared light transmission material.

Preferably, the frame component further comprises: a light gathering element being arranged corresponding to the avoid holes or avoid slots and used to at least gather light emitted by the infrared emitting tubes at their side edges or light received by the infrared receiving tubes at their side edges.

Preferably, the frame component is an integrally formed rectangular frame, or is of linear shape or "L" shape.

Preferably, the avoid hole or avoid slot is of U-shaped structure or polygonal structure.

Preferably, the frame component is made of infrared light transmission material.

Preferably, a portion of the frame component not on the light path of the infrared touch screen is made of a material not allowing infrared light to transmit through.

Preferably, when the frame component is installed on the printed circuit board, on a side close to a touch area of the infrared touch screen, the width of the frame component is larger than the width of the printed circuit board.

Preferably, the light gathering element comprises a plurality of light gathering hoods embedded into the avoid holes or avoid slots, wherein the light gathering hood has an opening at least on the light path of the infrared touch screen.

According to the second aspect of the present invention, there is provided an infrared touch screen, which comprises: a printed circuit board being arranged on its upper surface with a plurality of infrared emitting tubes or infrared receiving tubes; and a frame component located on the upper surface of the printed circuit board; wherein, a surface of the frame component facing toward the printed circuit board supports a non-electronic-device area of the upper surface of the printed circuit board in a surface contact manner.

Preferably, the infrared touch screen further comprises: a lower support component, on which a plurality of avoid holes or avoid slots is arranged for avoiding locations of electronic devices on a lower surface of the printed circuit board, wherein a surface of the lower support supports a non-electronic-device area of the lower surface of the printed circuit board in a surface contact manner.

Preferably, the frame component comprises: a light gathering element being arranged corresponding to the avoid holes or avoid slots and used to at least gather light emitted by the infrared emitting tubes at their side edges or light received by the infrared receiving tubes at their side edges.

Preferably, the frame component comprises: an upper support component installed on the upper surface of the printed circuit board, and a light transmission body allowing infrared light to transmit through, wherein the upper support and the light transmission body are arranged oppositely and separated by the infrared emitting tubes or infrared receiving tubes.

Preferably, the infrared touch screen further comprises a touch panel, the frame component has a portion exceeding the width of the printed circuit board and extending toward the touch panel, and the extending portion is lap jointed on the touch panel.

Preferably, the frame component and the touch panel are fixed in an adhesive manner.

Preferably, the frame component is an integrally formed rectangular frame or is of linear shape or L shape, the frame component comprises a plurality of avoid holes or avoid slots for avoiding locations of the infrared emitting tubes or infrared receiving tubes, and a portion of the frame component on a light path of the infrared emitting tubes and infrared receiving tubes is made of light transmission material.

Preferably, the avoid hole or avoid slot is of polygonal structure.

Preferably, a space portion of the avoid hole or avoid slot for avoiding the location of the infrared emitting tube at the emitting front of the infrared emitting tube is triangular, trapezoidal, semicircular or trapezoidal with both curved sides.

Preferably, the avoid hole or avoid slot for avoiding the location of the infrared receiving tube is of U-shaped structure with an opening toward an outer edge of the infrared touch screen.

Preferably, the frame component, the printed circuit board, and the lower support are fixed using at least one of adhesive connection, snap-fit connection, screw connection and hot-melt fixing connection.

Preferably, the light gathering element comprises a plurality of light gathering hoods embedded in the avoid holes or avoid slots, the light gathering hood having an opening at least on the light path of the infrared touch screen.

The frame component for the infrared touch screen according to the embodiments of the present invention can decrease the thickness of the infrared touch screen by arranging the avoid holes or avoid slots for avoiding the locations of the infrared emitting tubes and infrared receiving tubes when the frame component is installed on the infrared touch screen. In addition, the frame component according to the embodiments of the present invention can be used as a support component of the printed circuit board to support the printed circuit board in a surface contact manner, thereby effectively preventing the deformation of the printed circuit board and effectively decreasing the thickness of the infrared touch screen.

The various specific structures, functions and effects of the present invention will be further described below in detail in conjunction with the drawings.

DETAILED DESCRIPTION OF THE PREFERRED EMBODIMENT

In the following description, for the sake of convenience, when the infrared touch screen is assembled, seeing from the front of the infrared touch screen, the surface of the printed circuit board on which the infrared emitting tubes and infrared receiving tubes are installed is regarded as the front surface, while the other surface of the printed circuit board is regarded as the back surface.

The First Embodiment

Figure 1:
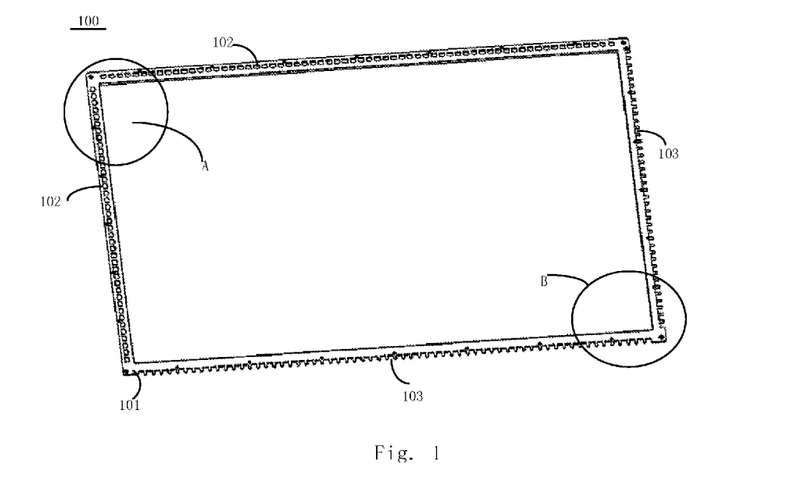
FIG. 1 is a schematic structural diagram of the frame component for an infrared touch screen according to the first embodiment of the present invention.
Figure 2:
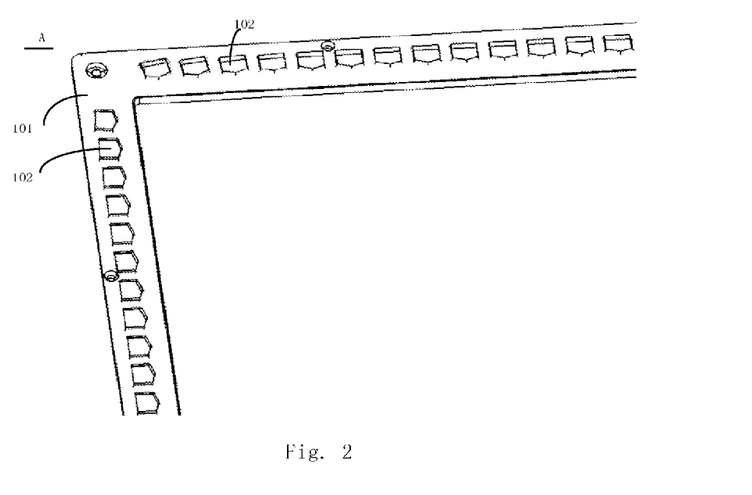
FIG. 2 is an enlarged view of portion A in FIG. 1.
Figure 3:
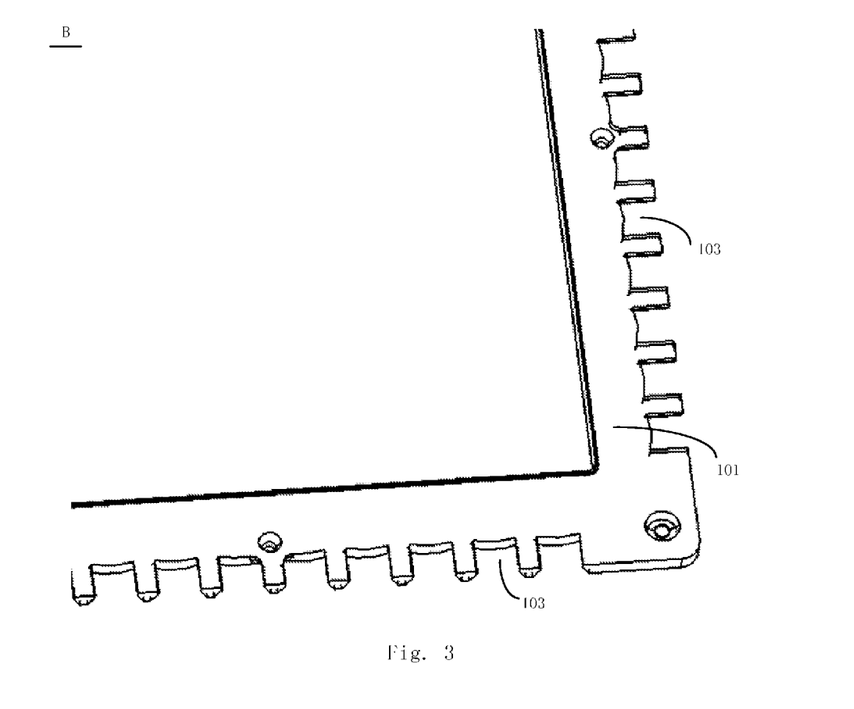
FIG. 3 is an enlarged view of portion B in FIG. 1.

In the present embodiment, an integrally formed frame component is described in detail. The frame component is a light transmission component. FIG. 1 schematically shows the light transmission component for the infrared touch screen, FIGS. 2 and 3 are the enlarged views of portions A and B in FIG. 1. The light transmission component 100 comprises a flat light transmission body 101, on which a plurality of first avoid holes 102, 103 is arranged for avoiding locations of the infrared emitting tubes and infrared receiving tubes on a printed circuit board of the infrared touch screen.

The specific structure of the light transmission component of the first embodiment is described in detail in conjunction with FIGS. 1 to 3.

The light transmission component 100 comprises a flat light transmission body 101, on which a plurality of first avoid holes 102, 103 are arranged. The first avoid holes 102 are used to avoid the locations of the infrared emitting tubes, the first avoid holes 103 are used to avoid the locations of the infrared receiving tubes. The first avoid holes 102 and 103 are arranged in parallel along the length direction of the light transmission body, respectively. The number of the first avoid holes 102 is same as that of the infrared emitting tubes, and the volume of the first avoid hole 102 is slightly larger than that of the infrared emitting tube. Similarly, the number of the first avoid holes 103 is same as that of the infrared receiving tubes, and the volume of the first avoid hole 103 is slightly larger than the volume of the infrared receiving tube. Thus the infrared emitting tubes and infrared receiving tubes can be placed in the first avoid holes 102 and 103 respectively, i.e. the first avoid holes 102 and 103 and the infrared emitting tubes and infrared receiving tubes are in a one-to-one correspondence. When in use, the infrared emitting tubes and infrared receiving tubes on the printed circuit board are placed in the first avoid holes 102 and 103 respectively, so it is not necessary to reserve the space between the light transmission component 100 and the printed circuit board for accommodating the infrared emitting tubes and infrared receiving tubes, which may make the light transmission component 100 and the printed circuit board closely contact and connect with each other. Therefore, the thickness of the touch screen can be decreased, and on the other hand, the flat light transmission component can be contacted with the printed circuit board in a large area, and can be used as a support component of the printed circuit board to support the printed circuit board, to prevent the printed circuit board from being bent or warped. Such kind of a large-area support can also be considered as a support in a surface contact manner. In addition, compared to the light transmission sheet/light transmission film used in the prior art, the light transmission component of the first embodiment does not need a special support component to support the light transmission sheet/light transmission film. Only one mold for the light transmission component can be made for mass production, and the manufacturing process is simple and easy.

Generally, as long as the infrared emitting tubes and infrared receiving tubes can be placed in the first avoid holes 102 and 103 respectively, there is no limitation to the shape of the first avoid holes 102 and 103. For example, it may be rectangular, square or any shape similar to the peripheral shape of the infrared emitting tubes and infrared receiving tubes. The first avoid holes 102 for avoiding the locations of the infrared emitting tubes and the first avoid holes 103 for avoiding the locations of the infrared receiving tubes may have the same or different shape. Preferably, as shown in FIGS. 1 and 2, the shape of the first avoid hole 102 for avoiding the location of the infrared emitting tube can be a shape of a steeple house constituted by a rectangle and a triangle, wherein the direction of the steeple top of the steeple house is toward a long edge of the light transmission body close to the touch panel. When the light transmission component 100 is applied to the infrared touch screen, the direction of the steeple top of the first avoid hole 102 is toward the touch panel, i.e. the light-emitting surface of the infrared emitting tube located in the steeple house is faced toward the steeple top of the steeple house structure. The light transmission component with this structure may enable the infrared light emitted by the infrared emitting tubes incident on the touch panel, and on the other hand, the light transmission component is equivalent to a concave lens and can expand the divergence angle of the infrared light beam emitted by the infrared emitting tubes so that the infrared light can be received by more infrared receiving tubes located on the other side of the touch panel, resulting in more light on the touch panel and thereby improving the resolution of the infrared touch screen. Besides the shape of the steeple house, the first avoid hole may also be of a shape of a domed house, that is, the triangle of the shape of the steeple house can be changed into a semicircle. The triangle may also be changed into a trapezoid. The two bevel sides of the trapezoid may be changed into the curved sides. In a case where a light gathering effect is needed, the semi-circular top may be opposite to the direction toward the touch panel, i.e. the opening of the semicircle is toward the direction of the touch panel. If the light gathering effect and the divergent effect are not required, the first avoid hole may be of rectangular or trapezoidal structure. Further, as shown in FIGS. 1 and 3, the first avoid hole 103 for avoiding the location of the infrared receiving tube may be of U-shaped structure with the bottom of the first avoid hole depressed inward. The opening of the U-shaped structure is faced toward the outer edge of the light transmission body 101, namely, toward the outer edge of the touch screen. When in use, the infrared receiving tube is located in the U-shaped structure, and the receiving surface of the infrared receiving tubes is faced toward the bottom of the U-shaped structure, namely, toward the touch panel or touch area. The light transmission component 100 with this structure is equivalent to a convex lens, and can gather the light incident on the light transmission component to the central directions of the receiving surfaces of the infrared receiving tubes, in order to enhance the intensity of the received signals to further improve the performance of the infrared touch screen. In the case where the intensity of the infrared light is satisfied, the bottom of the U-shaped structure may not be arc-surfaced but a plane, and the avoid hole or avoid slot may be of any polygonal structure.

For the light transmission component with the above structure, it may be clamped and connected tightly with the printed circuit board by arranging on the light transmission body the first avoid holes for avoiding the locations of the infrared elements on the infrared touch screen, without reserving the space for the infrared elements. When applied to the infrared touch screen, the light transmission component with this structure can be used as a support component of the printed circuit board to fasten the printed circuit board in a large area and improve the effect of fixing the printed circuit board, and on the other hand, can decrease the thickness of the touch screen, and can be applicable to the infrared touch screen with higher limitation on the thickness. In addition, by designing the first avoid hole of the light transmission component used at the emitting side as the shape of the steeple house and designing the first avoid hole of the light transmission component used at the receiving side as a U-shaped structure with the bottom depressed inward, the sensitivity performance of the infrared touch screen can be further improved. The U-shaped structure may be closed.

In order to improve utilization of light energy, the light transmission component can also comprise a light gathering element made of a metal sheet with high reflectivity.

Figure 4:
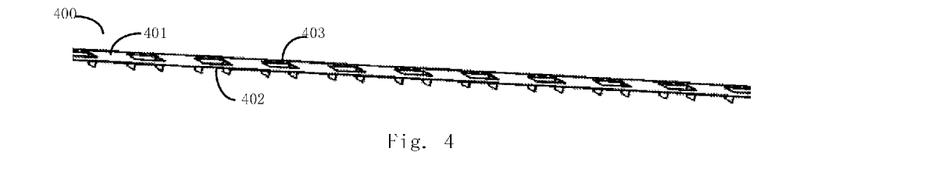
FIG. 4 is a schematic structural diagram of the light gathering element in the frame component according to the embodiment of the present invention.
Figure 5:
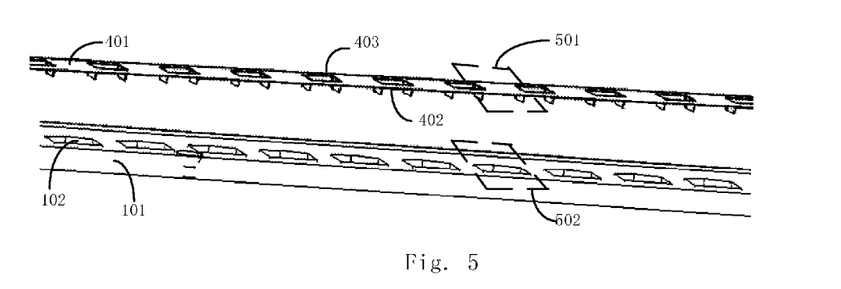
FIG. 5 is a schematic diagram showing the correspondence between the light gathering hood of the light gathering element and the first avoid hole on the light transmission body.

FIG. 4 shows a schematic structural diagram of the light gathering element. The light gathering element 400 comprises a plurality of light gathering hoods 401, a plurality of junction parts 403 and a plurality of opening parts 402. The junction parts 403 can connect a plurality of the light gathering hoods 401 and a plurality of opening parts 402. The opening parts 402 and the light gathering hoods 401 can be arranged at an interval. The location of each of the light gathering hoods 401 corresponds to the location of each of the first avoid holes 102 and 103 on the light transmission body 101. The light gathering hood can at least gather the divergent light at the side edge of the infrared emitting tube so as to reduce divergent light loss, or gather the light at the side edge of the infrared receiving tube so as to increase the receiving area of the infrared receiving tube. Each light gathering hood 401 has a width slightly smaller than that of the first avoid hole 102, 103, so that the light gathering hood 401 can be embedded into the first avoid hole 102, 103. FIG. 5 shows the correspondence between the light gathering hood of the light gathering element and the first avoid hole on the light transmission body, in which the light gathering hood 401 denoted by a dotted block 501 corresponds to the first avoid hole 102 denoted by a dotted block 502. When in use, the light gathering hood 401 is embedded in the first avoid hole 102 or 103, and covers the infrared emitting tube or infrared receiving tube in the first avoid hole 102 or 103. Preferably, each light gathering hood 401 may consist of one top surface and two side surfaces. The two side surfaces are parallel to each other and perpendicular to the top surface. When expanding, the side surfaces of the light gathering hood 401 may cover a part or all of the opening 402. That is, the light gathering element 400 may be formed by creating "⊥"-shaped gaps at an interval in a strip-like metal sheet and then bending the part surrounded by the gap at a angle of 90° degree along the side that is not cut, wherein the upper and lower portions connected by the "⊥"-shaped gap form the junction part 403, the bent portion becomes a side surface of the light gathering hood 401, and the opening left by the side surface of the light gathering hood 401 in the original location forms the opening part 402. The light gathering element 400 with this structure can be easily used and manufactured. When in use, the light emitted by the infrared emitting tubes at the side edges of the emitting tube will be reflected by the top surface and two side surfaces of the light gathering hood 401 to deflect toward the central portion of the emitting tube, thereby more effectively using the light energy.

Figure 6:
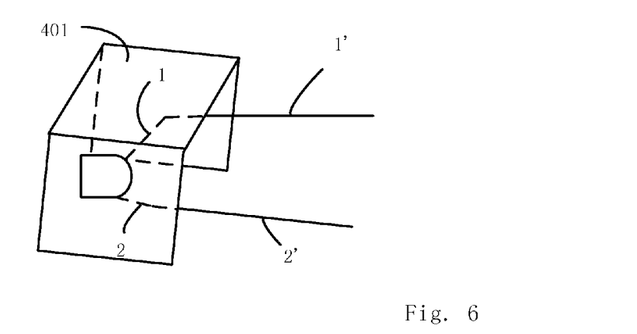
FIG. 6 is a schematic diagram of the light path for the light gathering hood reflecting the light at the edge to the center.

FIG. 6 shows a schematic diagram of a light path for the light gathering hood reflecting the light at the edge to the center. In FIG. 6, the light rays 1 and 2 are two light rays at the edge of an infrared light beam emitted by the infrared emitting tube, and cannot be received by the corresponding infrared receiving tube on the other side of the touch panel. The light rays 1' and 2' are the outgoing light rays formed by the light rays 1 and 2 reflected at the two side surfaces of the light transmission hood, and can propagate toward the center of the light beam. These two edge light rays become the light rays close to the center of the light beam after reflected, and can be received by the corresponding infrared receiving tubes, thereby fully utilizing the light energy, reducing the loss of the light energy, and improving the strength of the received signal. Since the light path is reversible, the working principle for the light gathering element at the receiving side is the same.

Like the first avoid hole, the shape of the light gathering hood 401 is not limited to the shape as shown in FIGS. 4 and 5. That is, the light gathering hood 401 may be of other shapes, and may match with the shape of the first avoid hole and have the opening in the propagation direction of the light (the light path of the touch screen). Namely, the light gathering hood 401 can semi-surround the infrared emitting tube or infrared receiving tube, and have the opening in the direction of the emitting surface of the infrared emitting tube or in the direction of the receiving surface of the infrared receiving tube. Also, the two side surfaces of the light gathering hood 401 shown in FIGS. 4 and 5 can be curved surfaces.

Alternatively, the plurality of light gathering hoods of the light gathering element can be separated, that is, there is no junction part between the light gathering hoods, and the light gathering element comprises a plurality of separated light gathering hoods. When in use, the light gathering hoods are arranged in the respective first avoid holes. The number of the light gathering hoods can be determined based on the number of the first avoid holes. Preferably, the light gathering material can be plated on the appropriate places of the avoid holes, and a layer of thin light gathering material is affixed on the light transmission body.

The avoid hole can be replaced with the avoid slot. That is, the structure on the light transmission body of the light transmission component for avoiding the locations of the infrared elements (i.e. the infrared emitting tubes and infrared receiving tubes) may be a through hole on the light transmission body or be a non-through groove on the light transmission body. The avoid slot and avoid hole may be provided on the light transmission body simultaneously. Moreover, the avoid slot may have the same shape as the avoid hole. For the first avoid slot, the light gathering element with the light gathering hoods connected integrally can be adjusted structurally to make the light gathering element become the groove structure matching the grooves. The light gathering element can be placed between the light transmission body and the circuit board by means of the openings on the emitting surfaces of the emitting tubes or the receiving surfaces of the receiving tubes. In addition, the bottoms of the grooves of the light gathering element may also be removed, similar to the structure shown in FIG. 4, the location of the opening 402 corresponds to the groove position of the light transmission body. The light transmission body is not limited to a flat shape, and may be adjusted according to the actual height of the infrared emitting tube and infrared receiving tube as well as appearance design requirements for the light transmission body. For example, the light transmission body may be of semi-cylindrical shape, or strip shape with square cross-section, etc. The material used for the light transmission body is not limited to one material, but can be two or more materials. For example, the portion of the light transmission body facing toward the touch screen can be made of the material with good infrared light transmittance, and the portion close to the frame can be made of the cheap and solid material.

The light transmission body of the light transmission component can be of linear shape. When in use, the four light transmission components can be connected end to end into a block shape. The light transmission body of the light transmission component may also be of "L" shape. When in use, the two light transmission components can be connected end to end into a block shape. The light transmission body of the light transmission component may also be an integrally formed rectangular frame without any connection port, and its structure is more solid and compact. When in use, the rectangular light transmission body can be directly nested on the printed circuit board of the infrared touch screen. The shape and direction of the avoid hole or avoid slot may be adjusted correspondingly according to the orientation of the infrared tube. For example, when the infrared tube is inclined orientated (i.e., the central symmetric line of the infrared tube is not perpendicular to the frame of the touch screen), the avoid hole or avoid slot is inclined correspondingly.

Figure 7:
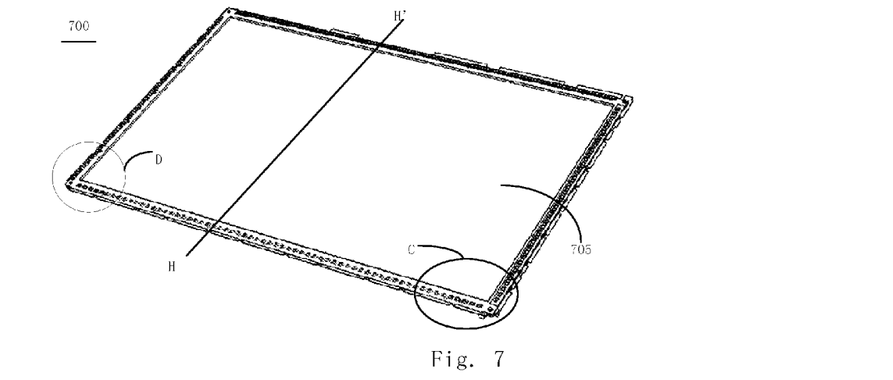
FIG. 7 is an overall schematic diagram of the infrared touch screen according to the first embodiment of the present invention.
Figure 8:
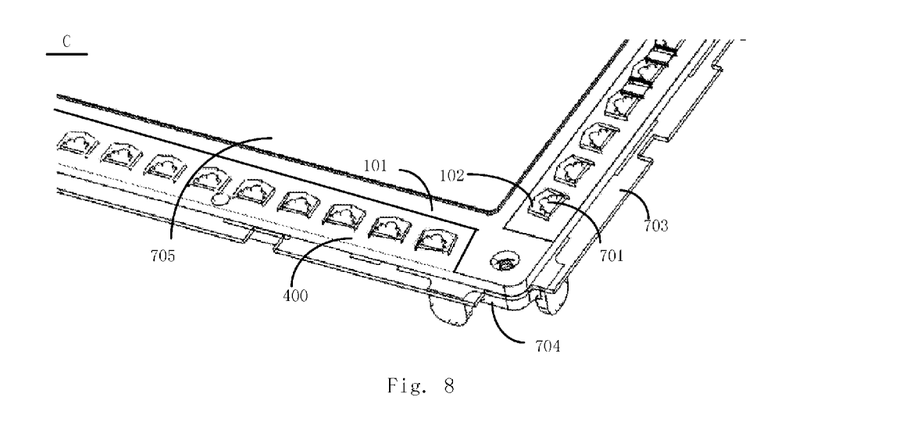
FIG. 8 is an enlarged view of portion C in FIG. 7.
Figure 9:
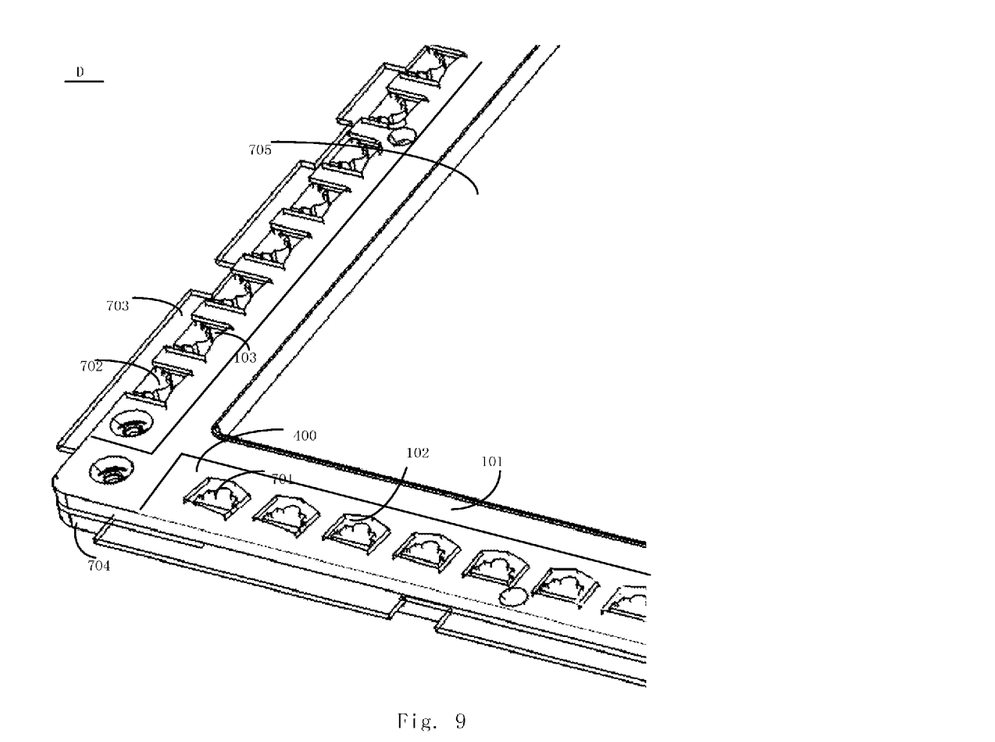
FIG. 9 is an enlarged view of portion D in FIG. 7.
Figure 10:
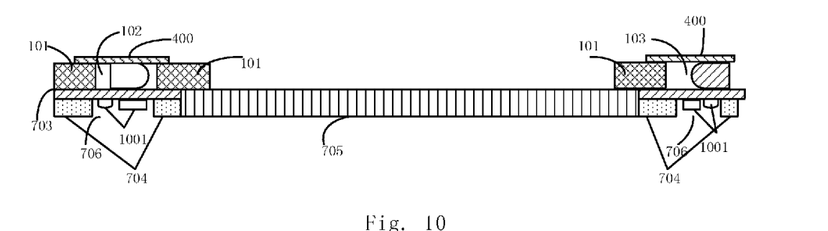
FIG. 10 is a cross-sectional diagram along the line HH' in FIG. 7.
Figure 11:
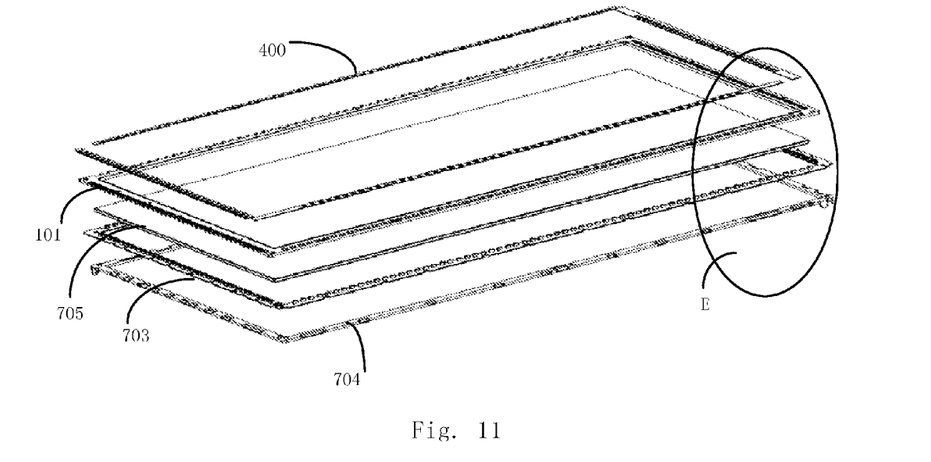
FIG. 11 is a layered structure diagram of the infrared touch screen according to the first embodiment of the present invention.
Figure 12:
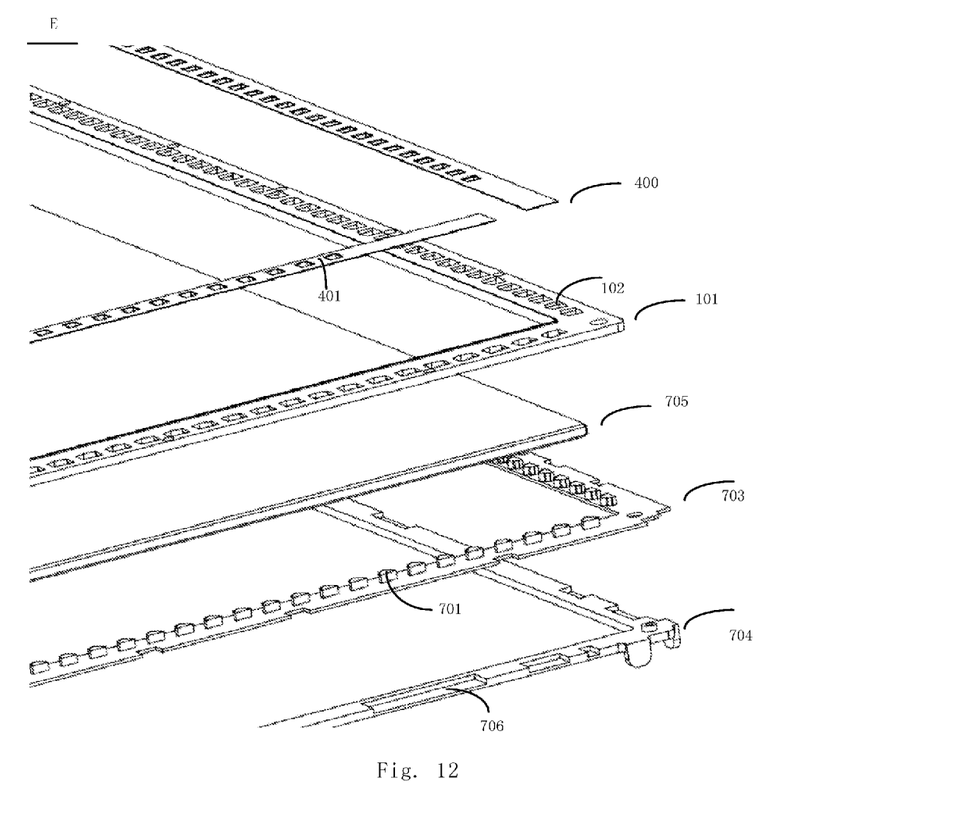
FIG. 12 is an enlarged view of portion E in FIG. 11.

The specific structure of the infrared touch screen of the embodiment will be described below in detail in conjunction with FIGS. 7 to 11. The infrared touch screen comprises a touch panel 705, a lower support component 704, a printed circuit board 703 on which infrared emitting tubes 701 and infrared receiving tubes 702 are installed, and the light transmission component 100. The light transmission component 100 comprises the light transmission body 101, the first avoid holes 102, 103, and the light gathering element 400. The lower support component 704 is provided with second avoid holes 706 for avoiding locations of electronic devices arranged on the back surface of the printed circuit board 703. The second avoid hole may also be replaced with a second avoid slot with groove structure. For convenience, the infrared touch screen according to the embodiment will be described in detail by example of the second avoid hole. The lower support component 704, the printed circuit board 703 and the light transmission body 101 of the light transmission component 100 are connected tightly to form the frame with a layered sandwich structure. The printed circuit board 703 is located between the lower support component 704 and the light transmission body 101 of the light transmission component. The first avoid holes 102, 103 on the light transmission component 100 accommodate the infrared transmission tubes 701 and infrared receiving tubes 702 on the front surface of the printed circuit board 703, and the second avoid holes 706 on the lower support component 704 accommodate the electronic devices located on the back surface of the printed circuit board 703, thereby allowing the light transmission component 100 and the lower support component 704 to tightly clamp the printed circuit board 703. FIGS. 7, 8 and 9 show the schematic diagrams of the infrared touch screen with the components being assembled together. FIG. 10 is the schematic cross-sectional diagram of FIG. 9 along the line HH', which shows the relative location relationships in the direction of thickness among the light gathering element 400, the light transmission body 101, the infrared emitting tubes 701 or infrared receiving tubes 702, the printed circuit board 703, the lower support component 704, and the touch panel 705. The light transmission body 101 and the lower support component 704 are located on the upper and lower surfaces of the printed circuit board 703 respectively. The infrared emitting tubes 701 are located in the respective first avoid holes 102 on the light transmission body 101. The infrared receiving tubes 702 are located in the respective first avoid holes 103 on the light transmission body 101. The electronic devices 1001 on the back surface of the printed circuit board 703 are located in the respective second avoid holes 706 of the lower support component 704. FIGS. 11 and 12 show the split structures of the components of the infrared touch screen. The respective components of the infrared touch screen are layered in an order from top to bottom as follows: the light gathering element 400, the light transmission body 101, the printed circuit board 703, the touch panel 705, and the lower support component 704. In the structure shown in FIG. 10, the touch panel 705 is not clamped and fixed. By way of adhesive, the light transmission body 101 can be glued to the edge of the touch panel 705. In the case where there is no touch panel 705, the touch frame can be fixed directly onto the display screen using colloidal adhesive connection, snap-fit connection or screw connection.

For the infrared touch screen with the above-described structure, the light transmission component plays the role of an upper support component, and can be clamped tightly with the lower support component 704 and the printed circuit board in a large area, thereby enhancing the strength of the printed circuit board and ensuring the flatness of the printed circuit board. On the other hand, according to the size of the infrared elements (the infrared emitting tubes and infrared receiving tubes) and other electronic devices, the avoid holes are provided to avoid the locations, unlike the existing infrared touch screen which needs reserve some space in the direction of thickness to avoid the locations of the infrared emitting tubes, infrared receiving tubes or other electronic devices. So the infrared emitting tubes, infrared receiving tubes or other electronic devices do not occupy extra space in thickness, thereby greatly reducing the thickness of the touch screen. The infrared touch screen in the prior art has to reserve the space of at least 3 mm in the direction of thickness for the electronic devices, while the infrared touch screen according to the embodiment of the present invention does not need to reserve any space in the direction of thickness for the electronic devices, allowing the electronic devices to use the thickness of the upper support component (the light transmission component) and lower support component, thereby greatly reducing the thickness of the infrared touch screen.

Figure 13:
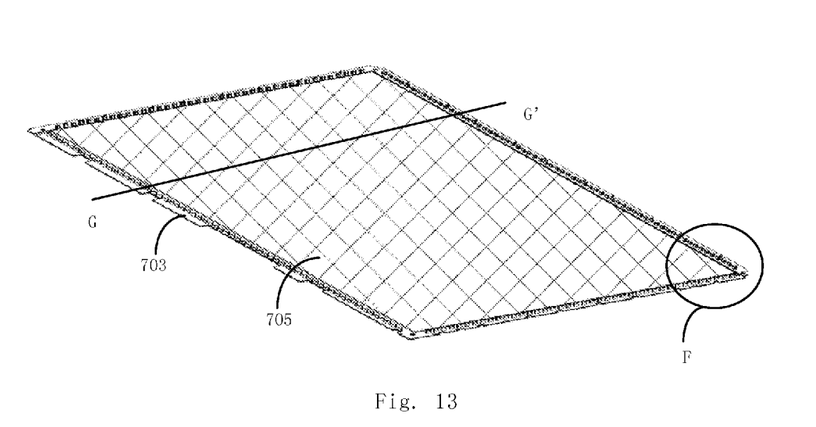
FIG. 13 is a schematic diagram of the infrared touch screen according to another embodiment of the present invention.
Figure 14:
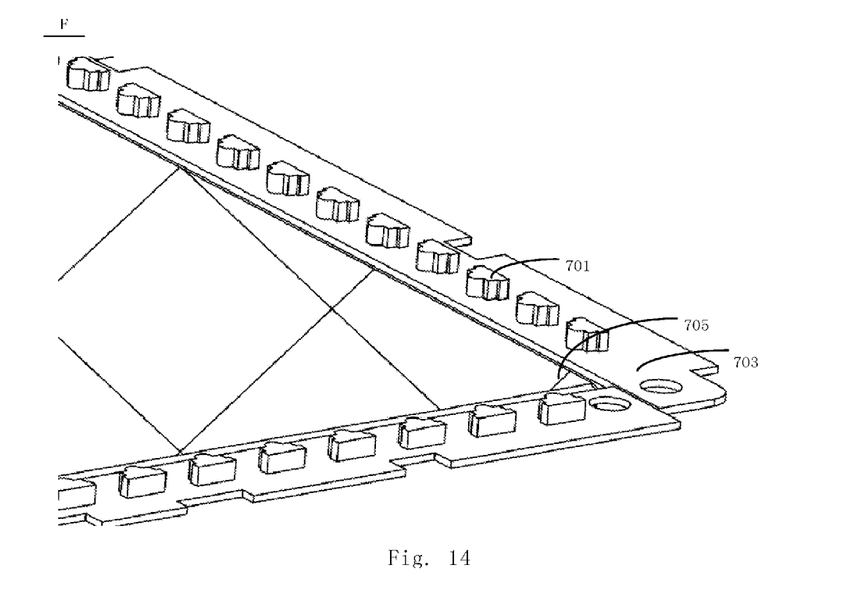
FIG. 14 is an enlarged view of portion F in FIG. 13.
Figure 15:
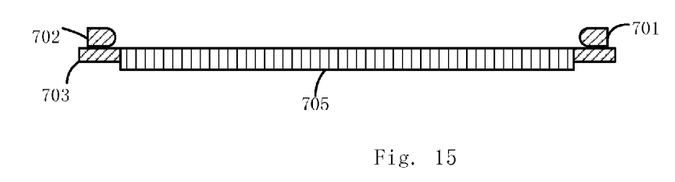
FIG. 15 is a cross-sectional diagram along the line GG' in FIG. 13.

The above-described infrared touch screen may further take the following measures for improvement. In order to further reduce the thickness of the infrared touch screen, preferably, the frame of the sandwich structure composed of the lower support component, the printed circuit board and the light transmission component can be arranged at the periphery of the touch panel, and the front surface of the printed circuit board and the upper surface of the touch panel are in the same plane. As shown in FIGS. 13, 14 and 15, the printed circuit board 703 and the touch panel 705 are located in the same horizontal plane, and the printed circuit board occupies the thickness of the glass. Compared to the existing infrared touch screen in which the printed circuit board is generally arranged on the upper surface at the edge of the touch panel, at least the thickness occupied by the printed circuit board is reduced from the thickness of the infrared touch screen, thereby further reducing the thickness of the infrared touch screen.

Yet further, in order to facilitate fixing, as shown in FIG. 10, the light transmission body 101 may be arranged close to one side of the touch panel 705 and not aligned with the side of the printed circuit board 703 close to the touch panel 705. The side of the light transmission body 101 (or the entire light transmission component comprising the light transmission body 101 and the light gathering element 400) close to one side of the touch panel 705 extends toward the touch panel 705, and the extending portion is lap jointed on the touch panel That is, the light transmission component may not be aligned with one side of the touch panel, and the portion of the light transmission component 100 staggered from the printed circuit board 703 is lap jointed on the touch panel 705, in order to reinforce the connection between the layered structure (sandwich structure) composed of the light transmission component, the printed circuit board and the lower support component and the touch panel to prevent the sandwich frame structure from stripping off the touch panel. There is no limitation about whether the side of the light transmission component away from the touch panel is aligned with the side of the printed circuit board away from the touch panel. They may be aligned with each other or staggered.

The infrared touch screen according to the embodiments of the present invention can reduce the thickness of the touch screen through the sandwich structure composed of the light transmission component, the printed circuit board and the lower support component clamped tightly together as well as through the coplanar printed circuit board and touch panel, and can increase the strength of the printed circuit board to ensure the flatness of the printed circuit board. The thickness of the infrared touch screen according to the embodiments of the present invention can be below 4 mm, while the thickness of the existing infrared touch screen is generally not less than 6 mm.

In the infrared touch screen according to the embodiments of the present invention, there is no limitation on the way of connecting the light transmission body, the light gathering element, the printed circuit board and the lower support component. They can be connected with each other using one or several of adhesive connection, snap-fit connection and screw connection, or other connections. Here, the description about the way of connecting the light transmission body, the light gathering element, the printed circuit board, and the lower support component may also be applied to other embodiments.

As another improvement, the infrared touch screen does not comprise the lower support component, and only the light transmission component on which the first avoid slots and/or first avoid holes are arranged is clamped tightly with the printed circuit board. And at that time, only the light transmission component plays the role of support. Although the strength of the light transmission component is less than the strength of the sandwich structure composed of the lower support component, the printed circuit board and the light transmission component, the thickness of the infrared touch screen still can be reduced. Moreover, all the electronic devices can be arranged on the upper surface of the printed circuit board, without any electronic device on the lower surface.

The Second Embodiment

Figure 16:
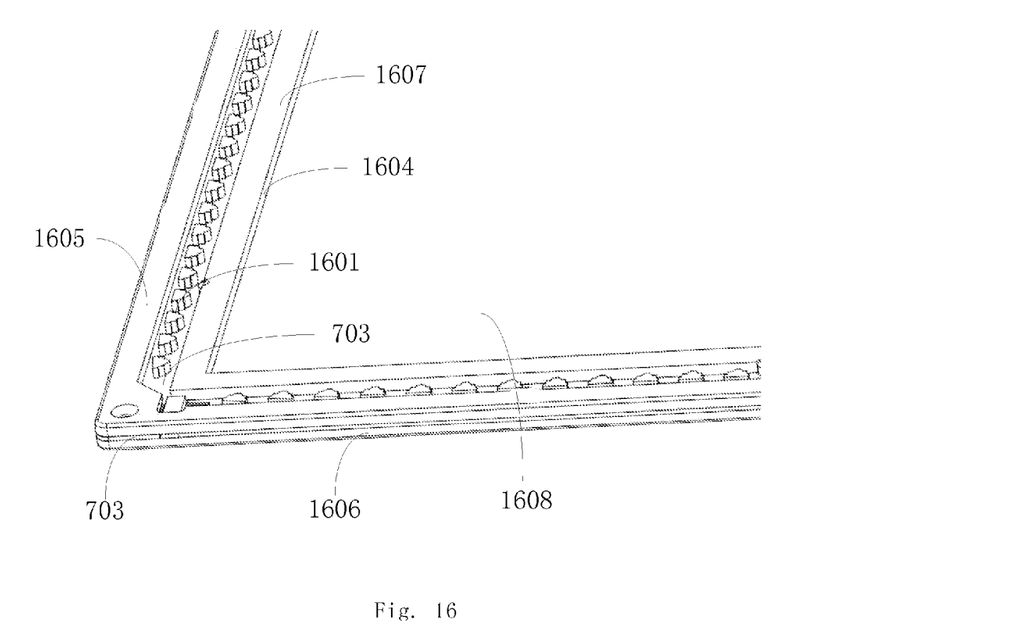
FIG. 16 is a schematic diagram of the infrared touch screen according to the second embodiment of the present invention.

As shown in FIG. 16, the second embodiment of the present invention is different from the first embodiment in that the light transmission component on the printed circuit board 703 is replaced with an upper support component 1605 which is installed on the upper surface of the printed circuit board 703, behind the emitting surface of the infrared emitting tubes or the receiving surface of the infrared receiving tubes, i.e. at the outer edge of the touch screen. The upper support component 1605 and the lower support component 1606 are mainly used to fix the printed circuit board. The upper support component 1605 can be as high as the infrared emitting tubes and infrared receiving tubes, or be slightly higher than the infrared emitting tubes and infrared receiving tubes. In addition to the fixing function, the upper support component 1605 and the lower support component 1606 can also be used to protect the printed circuit board. The lower support component 1606 comprises the avoid holes which match the electronic devices on the lower surface of the printed circuit board 703 to avoid their locations. The infrared emitting tubes or infrared receiving tubes do not exceed the thickness of the upper support component 1605, and the electronic devices do not exceed the thickness of the lower support component 1606, whereby the thickness of the touch screen can be reduced to a greatest extent. On the other hand, the upper support component 1605, the lower support component 1606 and the printed circuit board 703 can be affixed tightly to each other, and the upper support component 1605 and the lower support component 1606 are contacted with the printed circuit board 703 in a large area, whereby the strength of the printed circuit board 703 can be enhanced to prevent the printed circuit board 703 from bending or warping.

In the case where the infrared light filtering function is added, a light transmission body 1607 can be arranged on the upper surface of the printed circuit board 703 close to the inner edge of the touch screen frame (i.e. close to the edge of the touch area). The light transmission body 1607 and the upper support component 1605 are arranged oppositely on the two sides of the infrared transmission tubes or receiving tubes respectively, and the gap between the light transmission body 1607 and the upper support component 1605 can accommodate the infrared emitting tubes or receiving tubes. The light transmission body 1607 may be arranged in front of both of or one of the infrared emitting tubes and infrared receiving tubes. The light transmission body 1607 may be made of an infrared light filtering material, and may also be made of a transparent material. On one side surface of the light transmission body 1607 which the emitting or receiving light path passes through, a light filtering film is plated or a light filtering sheet 1604 is installed. The light transmission body 1607 may be as high as the upper support component 1605, or may be slightly lower than the upper support component 1605. The light transmission body 1607 may also be used for fixing.

The upper support component 1605, the printed circuit board 703 and the lower support component 1606 may be fastened together using a bolt, and the printed circuit board 703 is clamped and fixed by the upper support component 1605 and the lower support component 1606. Similarly, in the case where there is the light transmission body 1607, the light transmission body 1607, the printed circuit board 703 and the lower support component 1606 may also be clamped and fixed using a bolt. In addition to using the bolt to fix, adhesive connection, hot-melt fixing connection and the like may also be used. For the hot-melt fixing, please refer to the Chinese patent CN201869459U. In the various embodiments of the invention, any fixing way can be used, and the above described light gathering element can also be applied. In order to facilitate the fixing, the side of the light transmission body 1607 close to the touch panel 1608 can extend onto the touch panel 1608, and the extending portion is lap jointed on the touch panel 1608. That is, the side of the light transmission body 1607 close to the touch panel may not be aligned with the side of the printed circuit board 703 close to the touch panel 1608. The light transmission body 1607 partially overlaps with the touch panel 1608, and the overlapping portion may be connected to the touch panel 1608 by means of adhesive. Thus, the printed circuit board 703 and the touch panel 1608 can also be in the same plane.

In this embodiment, the avoid hole on the lower support component can be a through hole in the direction of thickness of the lower support component, or may be a non-through avoid slot in the direction of thickness. In the various embodiments of the present invention, there is no limitation on the number of the avoid holes and the number of electronic devices. However, since some electronic devices are relatively small and may be distributed more intensively, usually, one avoid hole may accommodate a plurality of electronic devices.

For the infrared touch screen with the above-described structure in which the printed circuit board is clamped tightly by the upper support component and the lower support component to form a sandwich clamping structure, although the thickness of each of the three separate components may not be high, by means of the sandwich clamping structure, the upper support component and the lower support component can contact with and clamp the printed circuit board in a large area, whereby the fixing of the printed circuit board can be enhanced and the flatness and firmness of the printed circuit board can be ensured. Moreover, it is not necessary to reserve more space in the direction of thickness for the infrared emitting tubes, the infrared receiving tubes and other electronic devices, so the thickness of the infrared touch screen can be reduced to a greatest extent, and it is possible to apply the infrared touch screen with the above structure to the ultra-thin displays. In this embodiment, the upper support component 1605 and the light transmission body 1607 as well as the light filtering sheet 1604 belong to the components of the infrared touch screen frame.

The embodiments of the present invention does not limit that the infrared tubes and other electronic devices would be arranged on two surfaces of the printed circuit board, and they can be in the same plane. In this case, for the first embodiment, the avoid holes or avoid slots for avoiding the locations of other electronic devices are also provided on the light transmission body. For the second embodiment, the avoid holes or avoid slots for avoiding the locations of other electronic devices may be provided on the upper support component.

The main idea of the present invention is that the upper support component and/or the lower support component can contact with and fasten the printed circuit board in a large area while reserving very little space to accommodate the infrared tubes and other electronic devices, to reduce the thickness of the touch screen to a greatest extent and further provide better fastening effect for the printed circuit board.

The specific embodiments of the present invention are described hereinabove, but the protection scope of the present invention is not limited thereto. Without departing from the disclosure of the present invention, a person skilled in the art can easily conceive any change or modification. For example, the number of the first avoid holes and/or first avoid slots on the light transmission component may be less than that of the infrared emitting tubes or infrared receiving tubes. In this case, one of the first avoid holes and/or first avoid slots can accommodate a plurality of infrared emitting tubes or infrared receiving tubes. The first avoid hole and/or avoid slot may also be a long strip of hole (or called opening) or groove along the direction of length of the light transmission body. Also, the number of the second avoid holes and/or second avoid slots on the support component may be less than that of the electronic device on the printed circuit board. In this case, one of the second avoid holes and/or second avoid slots can accommodate a plurality of electronic devices. These changes or modifications should be covered within the scope of the present invention, which is defined by the appended claims.

What is claimed is:

1. A frame component for an infrared touch screen, which is installed on an upper surface of a printed circuit board of the infrared touch screen, an array of infrared emitting tubes and an array of infrared receiving tubes being arranged on the upper surface, the frame component comprising:
   a plurality of avoid holes or avoid slots for avoiding locations of the infrared emitting tubes; and
   a plurality of avoid holes or avoid slots for avoiding locations of the infrared receiving tubes;
   wherein a surface of the frame component facing toward the printed circuit board supports a non-electronic-device area of the upper surface of the printed circuit board in a surface contact manner; and
   wherein a portion of the frame component on a light path of the infrared touch screen is made of infrared light transmission material;
   the plurality of avoid holes or avoid slots for avoiding the locations of the infrared emitting tubes each having a shape comprising a rectangle and one of a triangle, a trapezoid, a semicircle, and a trapezoid with curved sides, wherein the rectangle is closer to an outer edge of the frame component than said one of the triangle, the trapezoid, the semicircle, and the trapezoid with curved sides;
   the plurality of avoid holes or avoid slots for avoiding the locations of the infrared receiving tubes each being of U-shaped structure, an opening of the U-shaped structure facing an outer edge of the frame component.

2. The frame component according to claim 1, further comprising: a light gathering element being arranged corresponding to the plurality of avoid holes or avoid slots for avoiding locations of the infrared emitting tubes or the plurality of avoid holes or avoid slots for avoiding locations of the infrared receiving tubes and used to at least gather light emitted by the infrared emitting tubes at their side edges or light received by the infrared receiving tubes at their side edges.

3. The frame component according to claim 2, wherein the light gathering element comprises a plurality of light gathering hoods which are embedded into the corresponding avoid holes or avoid slots for avoiding locations of the infrared emitting tubes or the corresponding avoid holes or avoid slots for avoiding locations of the infrared receiving tubes, and the light gathering hood has an opening at least on the light path of the infrared touch screen.

4. The frame component according to claim 1, wherein the frame component is an integrally formed rectangular frame, or is of linear shape or "L" shape.

5. The frame component according to claim 4, wherein the frame component is made of infrared light transmission material.

6. The frame component according to claim 1, wherein when the frame component is installed on the printed circuit board, the width of the frame component, on a side close to a touch area of the infrared touch screen, is larger than the width of the printed circuit board.

7. An infrared touch screen, comprising:
   a printed circuit board being arranged on its upper surface with an array of infrared emitting tubes and an array of infrared receiving tubes; and
   a frame component located on the upper surface of the printed circuit board;
   wherein the frame component comprises:
      a plurality of avoid holes or avoid slots for avoiding locations of the infrared emitting tubes;
      a plurality of avoid holes or avoid slots for avoiding locations of the infrared receiving tubes; and
      a light transmission body allowing infrared light to transmit through, on which there are the plurality of avoid holes or avoid slots for avoiding the locations of the infrared emitting tubes and the plurality of avoid holes or avoid slots for avoiding the locations of the infrared receiving tubes;
   wherein a surface of the frame component facing toward the printed circuit board supports a non-electronic-device area of the upper surface of the printed circuit board in a surface contact manner;
   the plurality of avoid holes or avoid slots for avoiding the locations of the infrared emitting tubes each having a shape comprising a rectangle and one of a triangle, a trapezoid, a semicircle, and a trapezoid with curved sides, wherein the rectangle is closer to an outer edge of the frame component than said one of the triangle, the trapezoid, the semicircle, and the trapezoid with curved sides;
   the plurality of avoid holes or avoid slots for avoiding the locations of the infrared receiving tubes each being of U-shaped structure, an opening of the U-shaped structure facing an outer edge of the frame component.

8. The infrared touch screen according to claim 7, further comprising:

a lower support component, on which a plurality of avoid holes or avoid slots is arranged for avoiding locations of electronic devices on a lower surface of the printed circuit board, wherein a surface of the lower support component supports a non-electronic-device area of the lower surface of the printed circuit board in a surface contact manner.

9. The infrared touch screen according to claim 8, wherein the infrared touch screen further comprises a touch panel, and the frame component has a portion exceeding the width of the printed circuit board and extending toward the touch panel, the extending portion is lap jointed on the touch panel.

10. The infrared touch screen according to claim 9, wherein the frame component and the touch panel are fixed in an adhesive manner.

11. The infrared touch screen according to claim 8, wherein the frame component comprises: an upper support component installed on the upper surface of the printed circuit board; and wherein the upper support component and the light transmission body are arranged oppositely and separated by the infrared emitting tubes or infrared receiving tubes.

12. The infrared touch screen according to claim 8, wherein the frame component comprises: a light gathering element being arranged corresponding to the plurality of avoid holes or avoid slots for avoiding the locations of the infrared emitting tubes or the plurality of avoid holes or avoid slots for avoiding the locations of the infrared receiving tubes and used to at least gather light emitted by the infrared emitting tubes at their side edges or light received by the infrared receiving tubes at their side edges.

13. The infrared touch screen according to claim 12, wherein the light gathering element comprises a plurality of light gathering hoods embedded into the corresponding avoid holes or avoid slots for avoiding the locations of the infrared emitting tubes or the corresponding avoid holes or avoid slots for avoiding the locations of the infrared receiving tubes, the light gathering hood having an opening at least on the light path of the infrared touch screen.

14. The infrared touch screen according to claim 8, wherein the frame component is an integrally formed rectangular frame or is of linear shape or L shape.

15. The infrared touch screen according to claim 14, wherein the frame component, the printed circuit board, and the lower support are fixed using at least one of adhesive connection, snap-fit connection, screw connection and hot-melt fixing connection.

16. The infrared touch screen according to claim 7, wherein the frame component comprises: a light gathering element being arranged corresponding to the plurality of avoid holes or avoid slots for avoiding the locations of the infrared emitting tubes or the plurality of avoid holes or avoid slots for avoiding the locations of the infrared receiving tubes and used to at least gather light emitted by the infrared emitting tubes at their side edges or light received by the infrared receiving tubes at their side edges.

17. The infrared touch screen according to claim 16, wherein the light gathering element comprises a plurality of light gathering hoods embedded into the corresponding avoid holes or avoid slots for avoiding the locations of the infrared emitting tubes or the corresponding avoid holes or avoid slots for avoiding the locations of the infrared receiving tubes, the light gathering hood having an opening at least on the light path of the infrared touch screen.

18. The infrared touch screen according to claim 7, wherein the frame component is an integrally formed rectangular frame or is of linear shape or L shape.

19. The infrared touch screen according to claim 7, wherein the frame component comprises: an upper support component installed on the upper surface of the printed circuit board; and wherein the upper support component and the light transmission body are arranged oppositely and separated by the infrared emitting tubes or infrared receiving tubes.

20. The infrared touch screen according to claim 7, wherein the infrared touch screen further comprises a touch panel, and the frame component has a portion exceeding the width of the printed circuit board and extending toward the touch panel, the extending portion is lap jointed on the touch panel.

21. The infrared touch screen according to claim 20, wherein the frame component and the touch panel are fixed in an adhesive manner.

* * * * *